United States Patent
Brown

(10) Patent No.: US 10,698,294 B2
(45) Date of Patent: Jun. 30, 2020

(54) CONTROL OF AN SMA ACTUATION ARRANGEMENT

(71) Applicant: CAMBRIDGE MECHATRONICS LIMITED, Cambridge (GB)

(72) Inventor: Andrew Benjamin David Brown, Cambridge (GB)

(73) Assignee: Cambridge Mechatronics Limited, Cambridge (GB)

( * ) Notice: Subject to any disclaimer, the term of this patent is extended or adjusted under 35 U.S.C. 154(b) by 0 days.

(21) Appl. No.: 15/780,742

(22) PCT Filed: Dec. 8, 2016

(86) PCT No.: PCT/GB2016/053865
§ 371 (c)(1),
(2) Date: Jun. 1, 2018

(87) PCT Pub. No.: WO2017/098249
PCT Pub. Date: Jun. 15, 2017

(65) Prior Publication Data
US 2018/0348593 A1 Dec. 6, 2018

(30) Foreign Application Priority Data
Dec. 8, 2015 (GB) .................................. 1521632.8

(51) Int. Cl.
*G03B 3/10* (2006.01)
*G03B 5/00* (2006.01)
*G03B 5/02* (2006.01)

(52) U.S. Cl.
CPC ................. *G03B 3/10* (2013.01); *G03B 5/00* (2013.01); *G03B 5/02* (2013.01); *G03B 2205/0007* (2013.01); *G03B 2205/0076* (2013.01)

(58) Field of Classification Search
None
See application file for complete search history.

(56) References Cited

U.S. PATENT DOCUMENTS

| | | | | |
|---|---|---|---|---|
| 4,924,253 A | * | 5/1990 | Imai | G02B 7/32 396/419 |
| 5,649,253 A | * | 7/1997 | Cocca | G03B 43/00 396/319 |

(Continued)

FOREIGN PATENT DOCUMENTS

| CN | 101668947 A | 10/2010 |
|---|---|---|
| CN | 102400875 A | 4/2012 |

(Continued)

OTHER PUBLICATIONS

International Search Report for PCT/GB16/053865 dated Dec. 8, 2016.

*Primary Examiner* — William B Perkey
(74) *Attorney, Agent, or Firm* — Hartman Global IP Law; Gary M. Hartman; Domenica N. S. Hartman

(57) ABSTRACT

Resistance feedback control of drive signals for plural SMA actuator wires in an SMA actuation arrangement is performed. Target resistance values are set representing a desired position of a movable element with respect to the support structure. Measures of resistance of each SMA actuator wire are detected. Errors are derived from the target resistance values and the detected measures of resistance, the errors being adjusted by offsets. The powers of the drive signals supplied to SMA actuator wires are controlled. in accordance with the adjusted errors. The offsets have values selected to adjust the actual position of the movable element to match the desired positions represented by the target resistance values.

19 Claims, 3 Drawing Sheets

(56) References Cited

U.S. PATENT DOCUMENTS

2010/0275592 A1 11/2010 Topliss et al.
2011/0277462 A1 11/2011 Gregory et al.
2013/0300880 A1 11/2013 Brown et al.

FOREIGN PATENT DOCUMENTS

| CN | 104982028 A | 10/2015 |
|----|-------------|---------|
| JP | 2007064063 A | 3/2007 |
| WO | 2009069574 A1 | 4/2011 |
| WO | 20140076463 | 5/2014 |
| WO | 2014128349 A1 | 8/2014 |

* cited by examiner

CONTROL OF AN SMA ACTUATION ARRANGEMENT

The present invention relates to a shape memory alloy (SMA) actuation arrangement using SMA actuator wires to drive movement of a movable element with respect to a support structure.

SMA actuator wires may be connected in tension between a support structure and a movable element to drive movement of the movable element with respect to the support structure on contraction. Use of SMA actuator wires has numerous advantages compared to other types of actuator, particularly for miniature devices. Such advantages include provision of high forces in compact arrangements.

In many types of SMA actuation arrangement, plural SMA actuator wires are connected in an arrangement in which the SMA actuator wires are capable of driving movement of the movable element with respect to the support structure with plural degrees of freedom on selective contraction. This allows complex movements to be driven which is useful in many applications.

In one type of application, SMA actuation arrangements may be used in miniature cameras to effect focus, zoom or optical image stabilization (OIS). By way of example, WO-2011/104518, WO-2012/066285, WO-2014/076463 disclose SMA actuation arrangements employing eight SMA actuator wires that provide translational movement with three degrees of freedom and also rotational movement with three degrees of freedom. In the case that the movable element is a camera lens element, these SMA arrangements are capable of changing the focus and providing OIS. In other examples, WO-2013/175197 and WO-2014/083318 disclose SMA actuation arrangements employing four SMA actuator wires that provide translational movement with two degrees of freedom and also rotational movement with two degrees of freedom. In the case that the movable element is a camera lens element, these SMA arrangements are capable of providing OIS.

However, when such SMA actuation arrangements are manufactured in practice, there may be variance in the actual positions to which the movable element is driven by control of drive signals selected to drive the movable element to a desired position.

Such variances arise in various ways. Manufacturing tolerances result in variance between different manufactured SMA actuation arrangements which are nominally the same. Also, there may be variance in the response of the SMA actuator wires over time, for example due to operation in different thermal environments and due to aging over their lifetime. As the movable element is not constrained within the degrees of freedom in which the movable element is driven, such variance can result in reduced precision in control. In various uses this may degrade performance.

In types of SMA actuation arrangement where an image sensor is mounted on the support structure, and the movable element is a camera lens element arranged to focus an image on the image sensor, the degrees of freedom may include rotation of camera lens element about an axis perpendicular to the optical axis, in which the camera lens element tilts with respect to the sensor. In that case, it may be desirable that the rotational position is constant, for example holding the optical axis of the camera lens element perpendicular to the image sensor, as an error in this rotational position will give rise to a change of depth of focus across an image. However, variance in the positions to which the movable element is driven can create such errors.

According to a first aspect of the present invention, there is provided a method of controlling drive signals supplied to SMA actuator wires in an SMA actuation arrangement wherein the SMA actuator wires are connected in tension between a support structure and a movable element in an arrangement in which the SMA actuator wires are capable of driving movement of the movable element with respect to the support structure with plural degrees of freedom on selective contraction of the SMA actuator wires, the method comprising: setting target resistance values representing a desired position of the movable element with respect to the support structure; detecting measures of resistance of each SMA actuator wire; deriving errors from the target resistance values and the detected measures of resistance, the errors being adjusted by offsets having values selected to adjust the actual position of the movable element to match the desired positions represented by the target resistance values; and controlling the powers of the drive signals supplied to SMA actuator wires in accordance with the adjusted errors.

Resistance feedback control is applied to the control of the drive signals based on errors derived from the target resistance values and the detected measures of resistance. Those errors are adjusted by offsets that have values selected to adjust the actual position of the movable element to match the desired positions represented by the target resistance values. As a result, the offsets may be used to correct for variance in the actual positions to which the movable element is driven, for example due to manufacturing tolerances or variance in the response of the SMA actuator wires over time. This increases the precision in the control, and thereby improves performance.

The method may be applied to an SMA actuation arrangement wherein an image sensor is mounted on the support structure, and the movable element is a camera lens element arranged to focus an image on the image sensor.

In an example, the degrees of freedom may include rotations of the movable element with respect to the support structure about axes perpendicular to the optical axis, i.e. the desired position is a rotational position. In that case, the errors may be adjusted by offsets in respect of said rotations of the movable element with respect to the support structure about said axes perpendicular to the optical axis. The target resistance values may represent a constant desired rotational position of the movable element with respect to the support structure, for example, in the case that the movable element is a camera lens element, a constant desired rotational position of the camera lens element with respect to the support structure in which the optical axis of the camera lens element is perpendicular to the image sensor, which ensures that the there is no tilt relative to the image sensor. Then, the offsets have values selected to adjust the actual rotational position of the movable element to match the desired rotational position represented by the target resistance values.

In another example, the degrees of freedom may include translation of the movable element with respect to the support structure, i.e. the desired position is a translational position. In that case, the errors may be adjusted by offsets in respect of the translation of the movable element with respect to the support structure.

Such offsets may be calibrated based on measurements of the resistance of the SMA actuator wires while the movable element is at a known position. The calibration may be performed during manufacture of the SMA actuation arrangement, or during use of the SMA actuation arrangement, for example when the SMA actuation arrangement is powered up. In the case that the movable element is a camera lens element, the known position may be found by optimising the focus of the image on the image sensor or by driving the movable element against a reference feature provided in the SMA actuation arrangement.

According to a second aspect of the present invention, there is provided a SMA actuation arrangement comprising: a support structure; a movable element suspended on the support structure; plural SMA actuator wires connected in tension between the support structure and the movable element in an arrangement in which the SMA actuator wires are capable of driving movement of the movable element with respect to the support structure with plural degrees of freedom on selective contraction of the SMA actuator wires; and a control circuit arranged to supply drive signals to the SMA actuator wires, the control circuit being arranged to control the drive signals by a method similar to the first aspect of the present invention.

According to a third aspect of the present invention, there is provided a method of calibrating offsets for use in the first or second aspects, where the offsets are calibrated during manufacture of the SMA actuation arrangement.

To allow better understanding, an embodiment of the present invention will now be described by way of non-limitative example with reference to the accompanying drawings, in which:

FIG. 1 illustrates an SMA actuation arrangement 1 for a camera that is arranged as follows.

Figure 1:
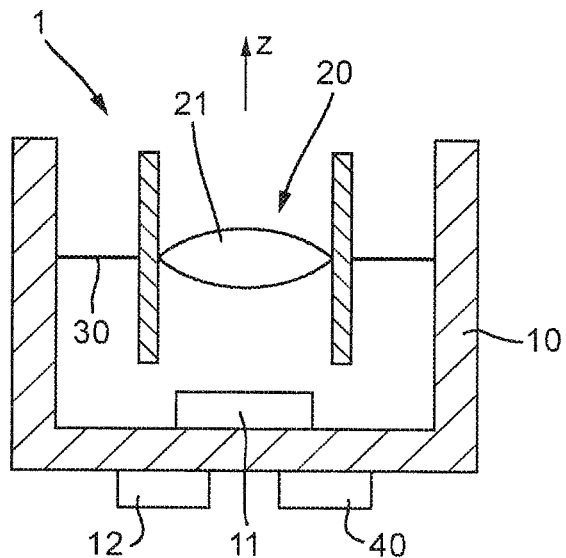
FIG. 1 is a schematic side view of an SMA actuation arrangement.

The SMA actuation arrangement 1 comprises a support structure 10 having an image sensor 11 mounted thereon. A camera lens element 20 is suspended on the support structure 10 and is arranged to focus an image on the image sensor 11. The camera lens element comprises one or more lenses 21, a single lens being illustrated in FIG. 1 for clarity. The camera is a miniature camera in which the one or more lenses 21 has a diameter of no more than 10 mm.

Although in this example the SMA actuation arrangement 1 is for a miniature camera in which the camera lens element 20 is the movable element, that is not limitative, and in general the SMA actuation arrangement 1 may be applied to any type of movable element.

Plural SMA actuator wires 30 are connected in tension between the support structure 10 and the camera lens element 20. The camera lens element 20 may be suspended on the support structure 10 exclusively by the SMA actuator wires 30. Alternatively, the camera lens element 20 may be suspended on the support structure 10 by a suspension system (not shown) that may have any suitable form for allowing movement of the camera lens element 20 with respect to the support structure 10 with the desired degrees of freedom, for example formed by flexures to allow movement in three dimensions, or formed by ball bearings or sliding bearings to allow movement in two dimensions while constraining movement in a third dimension.

The SMA actuator wires 30 are in an arrangement in which the SMA actuator wires 30 are capable of driving movement of the camera lens element 20 with respect to the support structure 10 with plural degrees of freedom on selective contraction of the SMA actuator wires 30. The SMA actuator wires 30 may be configured to drive such movement as shown in FIG. 2 or FIG. 3 which show first and second configurations of the SMA actuation arrangement 1, or in general may have other configurations.

The first and second configurations of the SMA actuation arrangement 1 will now be described. For ease of reference, the z axis is taken to be the optical axis of the camera lens element 20 and the x and y axes are perpendicular thereto. In the desired orientation of the camera lens element 20, the optical axis of the camera lens element 20 is perpendicular to the image sensor 11 and the x and y axes are lateral to the image sensor 11.

Figure 2:
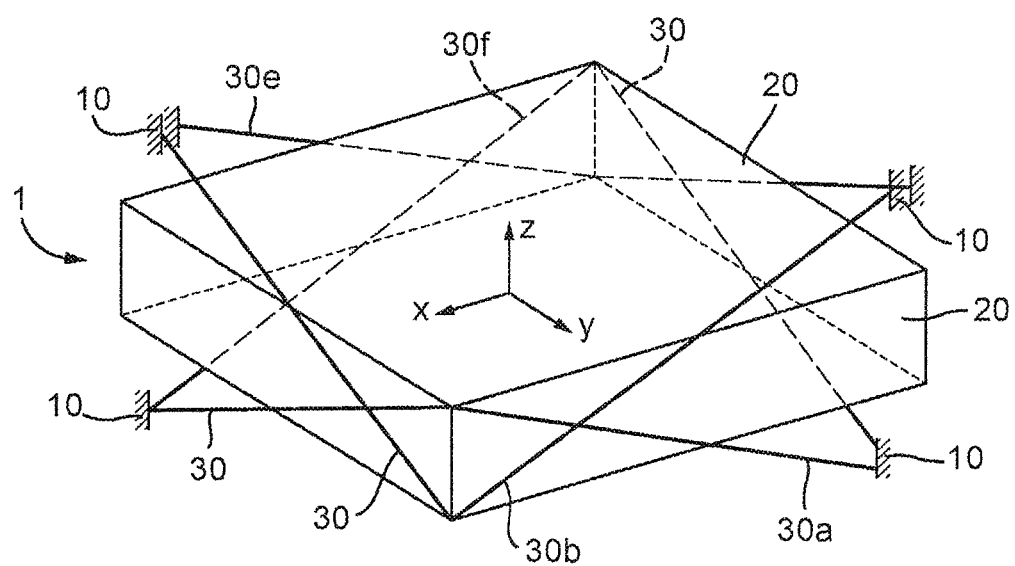
FIG. 2 is a perspective view of a first configuration of the SMA actuation arrangement.
Figure 3:
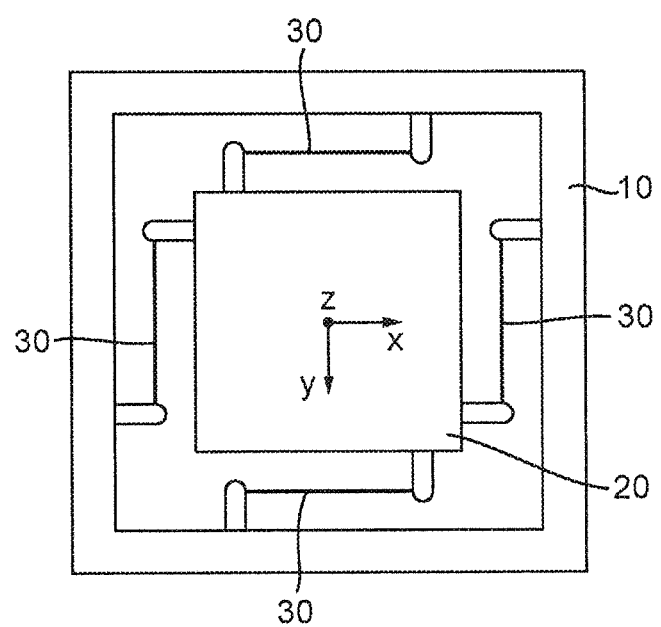
FIG. 3 is an axial view of a second configuration of the SMA actuation arrangement.

FIG. 2 illustrates a first configuration for the SMA actuator arrangement 1 in which eight SMA actuator wires 30 are provided. In the first configuration, the SMA actuation arrangement 1 may have a construction as described in further detail in any of WO-2011/104518, WO-2012/066285 or WO-2014/076463, to which reference is made. However, an overview of the arrangement of SMA actuator wires 30 is as follows.

Two SMA actuator wires 30 are provided on each of four sides of the camera lens element 20 in a 2-fold rotationally symmetric arrangement.

Each SMA actuator wire 30 extends perpendicular to a line radial of the optical axis of the camera lens element 20, that is substantially perpendicular to the x axis or to the y axis. However, the SMA actuator wires 30 are inclined with respect the optical axis of the camera lens element 20, so that they each provide a component of force along the z axis and a component of force primarily along the x axis or primarily along the y axis.

Each SMA actuator wires 30 is connected at one end to the support structure 10 and at the other end to the camera lens element 20, selected so that in combination with the inclination of the SMA actuator wires 30, different SMA actuator wires 30 provide components of force in different directions along the z axis and different directions along the x axis or along the y axis. In particular, the pair of SMA actuator wires 30 on any given side of the camera lens element 20 are connected to provide components of force in opposite directions along the z axis, but in the same direction along the x axis or along the y axis. The two pairs of SMA actuator wires 30 on opposite sides of the camera lens element 20 are connected to provide components of force in opposite directions along the x axis or along they axis.

Thus, the SMA actuator wires 30 are capable, on selective contraction, of driving movement of the camera lens element 20 with respect to the support structure 10 in translational movement with three degrees of freedom (i.e. along the x, y and z axes) and also rotational movement with three degrees of freedom (i.e. around the x, y and z axes). Due to the symmetrical arrangement, movement with each of the degrees of freedom is driven by contraction of different combinations of SMA actuator wires 30. As the movements add linearly, movement to any translational and/or rotational position within the six degrees of freedom is driven by a linear combination of contractions of the SMA actuator wires 30. Thus, the translational and rotational position of the camera lens element 30 is controlled by controlling the drive signals applied to each SMA actuator wire 30.

In use, translational movement along the optical axis of the camera lens element 20 (i.e. along the z axis) may be used to change the focus of an image formed by the camera lens element 20 and translational movement laterally of the optical axis of the camera lens element 20 (i.e. along the x and y axes) may be used to provide OIS. In that case, it is desired that there is no rotational movement around the x or y axis. As the rotational position is derived by the contractions of the SMA actuator wires 30 this effectively requires control of drive signals to provide a constant rotational position.

FIG. 3 illustrates a second configuration for the SMA actuator arrangement 1 in which only four SMA actuator wires 30 are provided. In the second configuration, the SMA actuation arrangement 1 may have a construction as described in further detail in any of WO-2013/175197 or WO-2014/083318, to which reference is made. However, an overview of the arrangement of SMA actuator wires 30 is as follows.

In the second configuration, movement of the camera lens element 20 with respect to the support structure 10 along the optical axis (i.e. along the z axis) is constrained mechanically, for example by a suspension system which supports the camera lens element 20 on the support structure 10, which may comprise beams as disclosed in WO-2013/175197, ball bearings as disclosed in WO-2014/083318, or a sliding bearing. Thus less SMA actuator wires 30 are provided with a simpler arrangement as it is not necessary to drive movement along the optical axis.

One SMA actuator wire 30 is provided on each of four sides of the camera lens element 20 in a 2-fold rotationally symmetric arrangement. Each SMA actuator wire 30 extends substantially perpendicular to a line radial of the optical axis of the camera lens element 20, that is substantially perpendicular to the x axis or to the y axis and thus provides a component of force primarily along the x axis or primarily along the y axis. Each SMA actuator wires 30 is connected at one end to the support structure 10 and at the other end to the camera lens element 20. The ends at which the SMA actuator wires 30 are connected to the support structure 10 alternate on successive sides around the z axis. As a result, the pairs of SMA actuator wires 30 on opposing sides provide a component of force in opposite directions along the x axis or in opposite directions along the y axis. However, the torques applied by two pairs of SMA actuator wires 30 are in opposite directions around optical axis (z axis).

Thus, the SMA actuator wires 30 are capable, on selective contraction, of driving movement of the camera lens element 20 with respect to the support structure 10 to translational movement with two degrees of freedom (i.e. along the x and y axes) and also rotational movement with one degrees of freedom (i.e. around the z axis). Due to the symmetrical arrangement, movement with each of the degrees of freedom is driven by contraction of different combinations of SMA actuator wires 30.

As the movements add linearly, movement to any translational and/or rotational position within the three degrees of freedom is driven by a linear combination of contractions of the SMA actuator wires 30. Thus, the translational and rotational position of the camera lens element 30 is controlled by controlling the drive signals applied to each SMA actuator wire 30.

In use, translational movement laterally of the optical axis of the camera lens element 20 (i.e. along the x and y axes) may be used to provide OIS. In that case, it is may be desired that there is no rotational movement around the optical axis or it may be that the rotation around the optical axis is varied, which may depend on the nature of the suspension system. As the rotational position is derived by the contractions of the SMA actuator wires 30 this effectively requires control of drive signals to provide a constant rotational position.

Figure 4:
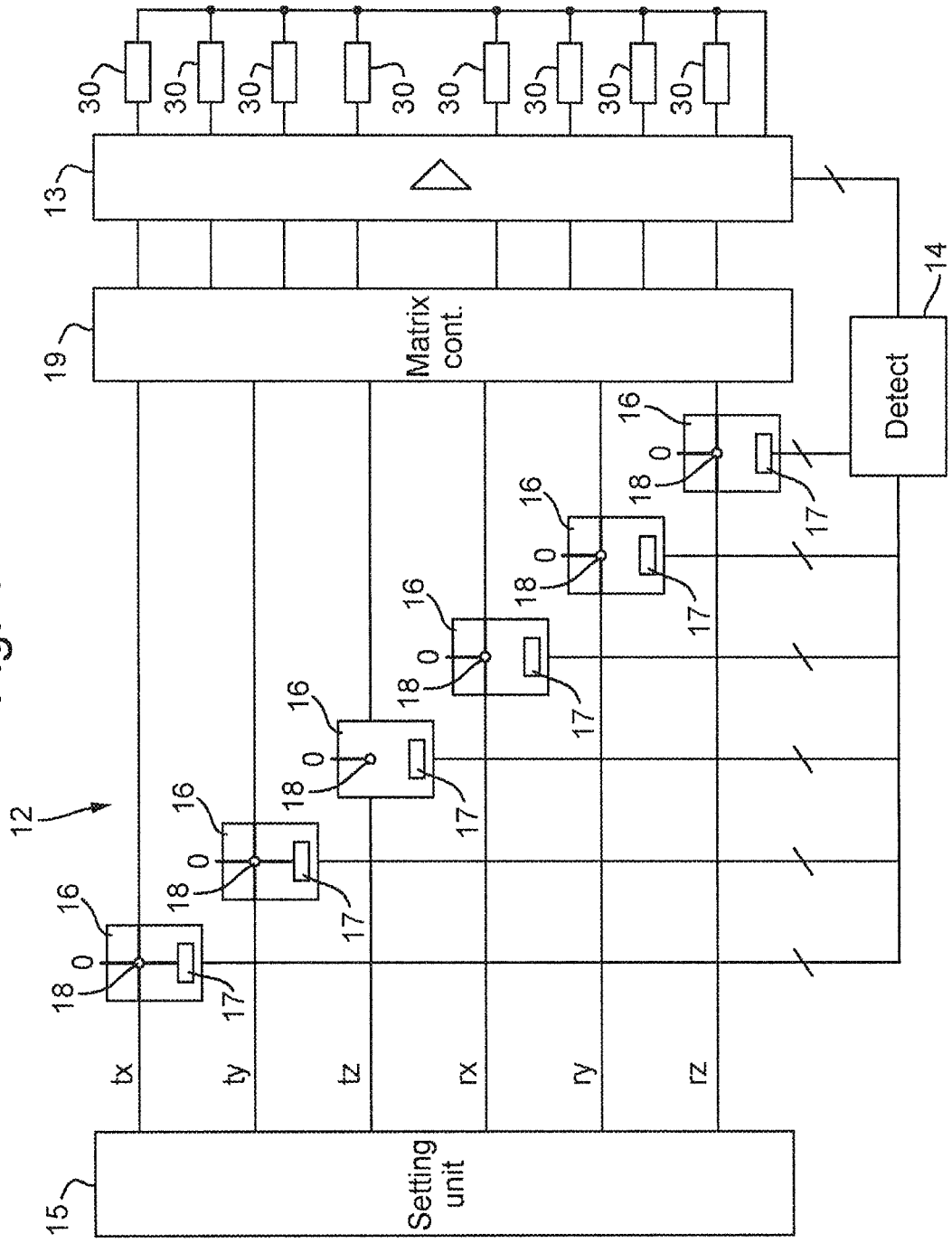
FIG. 4 is a diagram of the control circuit of the SMA actuation arrangement.

The SMA actuation arrangement further comprises a control circuit 12 which may be implemented in an integrated circuit chip. The control circuit 12 is arranged to supply drive signals to the SMA actuator wires 30. The control circuit 12 is shown in FIG. 4 and arranged as follows. The control circuit 12 is described with reference to controlling the first configuration of the SMA actuation arrangement 1 and hence to controlling movement with six degrees of freedom. The control circuit 12 may be applied to the second configuration of the SMA actuation arrangement 1 which controls movement with three degrees of freedom simply by reducing the number of SMA actuators 30 and omitting the parts of the circuit which relate to the degrees of freedom absent from the second configuration of the SMA actuation arrangement 1.

The control circuit 12 includes a drive circuit 13 arranged to generate a drive signal for each SMA actuator wire 30 in accordance with a control signal for each SMA actuator wire 30 which is supplied thereto. The drive circuit 13 is connected to each SMA actuator wire 30 and supplies the drive signals thereto. The drive circuit 13 may be a constant-voltage current source or a constant-current current source. For example, in the latter case the constant current might be of the order of 120 mA. The drive signal generated by the drive circuit 13 is a pulse-width modulation (PWM) signal. The PWM duty cycle of the drive signal is varied by the drive circuit 13 to vary the power in accordance with the respective control signal.

The control circuit 12 generates the control signals using resistance feedback control on the basis of target resistance values, as follows.

The control circuit 12 includes a detection circuit 14 which detects measures of resistance of each SMA actuator wire 30 for use in the feedback.

The detection circuit 14 may be connected across each SMA actuator wire 30. In the case that the drive circuit 13 is a constant-current current source, the detection circuit 14 may be a voltage detection circuit operable to detect the voltage across each SMA actuator wire 30 which is a measure of the resistance of the SMA actuator wire 30. In the case that the drive circuit 13 is a constant-voltage current source, the detection circuit 14 may be a current detection circuit. For a higher degree of accuracy, the detection circuit 14 may comprise a voltage detection circuit and a current detection circuit operable to detect both the voltage and current across each SMA actuator and to derive a measure of resistance as the ratio thereof.

Alternatively, the SMA actuator wires 30 may be connected together at the movable element, in which case the drive circuit 13 may generate drive signals and the detection circuit 14 may detect measures of resistance using techniques of the type disclosed in WO-2012/066285.

The control circuit 12 includes a setting unit 15 which sets target resistance values. The target resistance value can be set for each wire or can be set for different combinations of wire resistances. For example combinations of wires can be selected that correspond to each degree of freedom. To allow better understanding the following description will assume the case where a target resistance value is set in respect of each of the degrees of freedom. Thus the target resistance values represent a desired position of the camera lens element 20 with respect to the support structure 10. Thus, the target resistance values are labelled in FIG. 4 as target resistance values tx, ty and tz representing translational position along the x, y and z axes and target resistance values rx, ry and rz representing rotational position around the x, y and z axes.

The setting unit 15 sets the target resistance values according to the desired control of the camera lens element 20, for example as follows.

The target resistance values tx and ty representing translational position along the x and y axes, perpendicular to the optical axis, may be set to provide OIS, for example on the basis of output signals of a vibration sensor 40 which acts as a vibration sensor and detects the vibrations that the SMA actuation arrangement 1 is experiencing. The vibration sensor 40 may be a gyroscope sensor which detects the angular velocity of the SMA actuation arrangement 1 in three dimensions or an accelerometer which detect motion allowing the orientation and/or position to be inferred.

The target resistance value tz representing translational position along the z axis, along the optical axis, may be set to change the focus in a desired manner, for example in accordance with user input or in accordance with the output of an autofocus control system.

The target resistance values rx and ry representing rotational position around the x and y axes, perpendicular to the optical axis, may be set to represent a constant desired rotational position of the camera lens element 20 in which the optical axis of the camera lens element is desired to be perpendicular to the image sensor 11, so that the depth of focus is uniform across the image.

The target resistance values rz representing rotational position around the z axis, along the optical axis, may be set to represent a constant desired rotational position of the camera lens element 20 where this is necessary for the suspension system, may be varied as desired, or may be omitted.

The control circuit 12 includes an error detector 16 in respect of each of the degrees of freedom. Each error detector 16 is supplied with a respective one of the target resistance values and all the detected measures of resistance.

Each error detector 16 includes a feedback measure unit 17 which derives feedback values in respect of the respective degrees of freedom. The feedback values are linear sums of the detected measures of resistance of the SMA actuator wires 30. The scaling factors for each measure of resistance in the linear sums correspond to the contribution of the SMA actuator wires 30 to movement within the degree of freedom concerned. This depends on the geometry of the SMA actuator wires 30 in the SMA actuator arrangement 1.

As an example, consider a system where the rotational position around the x axis (RotX) is a function of the length of SMA actuator wires 30 of equal length labelled a, b, e and f. The length of the SMA actuator wires 30 is related to the resistance of the SMA actuator wires 30 so that RotX=K*(Ra−Rb+Re−Rf) where K is a constant of proportionality and Ra, Rb, Re and Rf are the resistances of wires a, b, e and f respectively. In this case, the feedback value is a linear sum (Ra−Rb+Re−Rf). In this example the scaling factors in the linear sum are all 1 or −1 as the symmetrical configuration causes the wires to contribute equal amounts, but for other configurations other scaling factors may be applied in accordance with the geometry concerned.

Each error detector 16 includes a comparator 18 which derives an error between the target resistance value and the feedback value in respect of the degree of freedom concerned, and further adjusted by an offset O. The values of the offsets O are described further below. The adjustment may be applied by offsetting the error derived by the comparator 18 as shown in FIG. 4. As alternatives, the adjustment may be applied by offsetting the target resistance value prior to supply to the comparator 18 (for example within the setting unit 15) or by offsetting the feedback value prior to supply to the comparator 18, both of which alternatives have the same effect.

The adjusted errors derived by the error detectors 16 are supplied to a matrix controller 19 which derives the control signals for each SMA actuator wire 30 so as to control the powers of the drive signals in accordance with the adjusted errors, in particular using a closed-loop control algorithm that reduces the errors. For each SMA actuator wire 30, the matrix controller takes account of the adjusted errors in respect of degrees of freedom affected by the contraction of the SMA actuator wire 30 concerned. This is done using scaling factors that correspond to the contribution of the SMA actuator wires 30 to movement within the degree of freedom concerned. This is effectively the inverse relationship from that used to derive the feedback values in respect of the respective degrees of freedom. Again, it depends on the geometry of the SMA actuator wires 30 in the SMA actuator arrangement 1. The matrix controller 19 supplies the control signals to the drive circuit 13.

The setting unit 15, the error detectors 16 and the matrix controller 19 may be implemented in one or more processors, which may be a common processor even though they are illustrated as separate components in FIG. 4 for ease of understanding.

Since the feedback control is performed on the basis of the feedback values, effectively setting the tension and temperature of the SMA actuator wires 30 may be performed independently of the positional control by varying the average power supplied to each SMA actuator wires 30. Thus, the control signals may represent the relative power of the respective drive signal and the drive circuit 13 may then supply a drive signal that has a power equal to the average power supplied to each of the SMA actuator wires 30 multiplied by the relative power represented by the control signal. This has the effect of adjusting the relative amounts by which the powers of the drive signals vary from an average power in accordance with the control signals. The average power may be kept constant during an actuation operation but may be varied between actuations, for example in response to a measure of the ambient temperature, for example as disclosed in more detail in WO-2014/076463. Other methods of combining the tension and position/orientation could be used.

The offsets O used to adjust the derived errors will now be considered. The offsets O have values selected to adjust the actual position of the camera lens element 20 to match the desired positions represented by the target resistance values. The offsets O are chosen to correct for variance in the actual positions to which the movable element is driven, for example due to manufacturing tolerances or variance in the response of the SMA actuator wires over time. Thus, the adjustment by the offsets O increases the accuracy in the control of the drive signals.

In general, the offsets O are stored in the control circuit 12, the offsets O may be calibrated during manufacture and pre-stored in the SMA actuation arrangement or may be calibrated during use of the SMA actuation arrangement.

There will now be considered the offsets O in respect of rotation (tilt) of the optical axis of the camera lens element 20, i.e. rotational position of the camera lens element 20 about the x and y axes, perpendicular to the optical axis. As mentioned above, the optical axis is desired to be perpendicular to the image sensor 11 (i.e. no tilt), so that the depth of focus is uniform across the image. In the absence of the offset, when the camera lens element 20 is driven in accordance with a constant target resistance value representing a constant desired reference position, there can nonetheless be variance in the actual position to which the movable element is driven, for example due to manufacturing tolerances or variance in the response of the SMA actuator wires over time. The offsets O in respect of rotation of the camera lens element 20 with respect to the support structure 10 about an axis perpendicular to the optical axis (i.e. rotation about the x axis or y axis) correct for that.

The offsets O may be calibrated during manufacture or during use, for example when the SMA actuation arrangement is powered up. The calibration may be performed based on measurements of the resistance of the SMA actuator wires 30 while the camera lens element 20 is at a known position with respect to the support structure 10.

One option for the calibration is that the known position is a position at which the focus of the image on the image sensor 11 is optimised. That is the drive signals may be adjusted until the optical axis is normal to the image sensor, that is, until the there is no tilt, as judged for example by optimum focus across the image.

The resistance of each of the SMA actuator wires 30 in this state is measured and used to derive the offsets O to compensate for any actual variation of the actual feedback values which are derived in this state.

By way of example, this may be approached for the first configuration of the SMA actuation arrangement 1 using the following method which refers to the rotational position around the x axis, an equivalent method also being applied to the rotational position around the y axis.

Consider the case that the rotational position around the x axis is a function of the length of SMA actuator wires 30 of equal length labelled a, b, e and f. The length of the SMA actuator wires 30 is related to the resistance of the SMA actuator wires 30 so that $RotX=K*(Ra-Rb+Re-Rf)$ where K is a constant of proportionality and Ra, Rb, Re and Rf are the resistances of wires a, b, e and f respectively. The drive signals applied to the SMA actuator wires 30 are varied until the image is in focus at all points on the image sensor, showing that the lens is at the desired zero tilt. The resistance of all the wires are measured and these are used to calculate a first reference offset Roff1 equal to $(Ra-Rb+Re-Rf)$.

This offset method is expected to provide adequate compensation for many purposes, but is best performed during manufacture where extremely accurate focussing on the image sensor 11 is available. In that case, any subsequent variations, for example due to gradual changes in crimp and connection resistance during use, may affect the resistance of the wires and interfere with the compensation.

Another option for the calibration, is that the known position is a position at which the camera lens element 20 contacts a reference feature against which the camera lens element 20 may be driven. The reference feature may be the image sensor 11, an endstop provided for limiting motion, or a reference feature provided specifically for this purpose which may comprise, for example, three contact points. In this case, the offsets O may be calibrated based on measurements of the resistance of the SMA actuator wires while driving the camera lens element 20 to contact the reference feature, as follows. Contact or loss of contact with the reference feature can be detected from the dependence of the measured resistance of the SMA actuator wires 30 on the power of the drive signals applied.

As a preliminary step during manufacture, the camera lens element 20 is driven against the reference feature, and the rotational position of the camera lens element 20 in this state is measured and stored in the control circuit 12.

Then during use, for example when the SMA actuation arrangement 1 is powered up, the camera lens element 20 is driven again against the reference feature. The resistance of each of the SMA actuator wires 30 in this state is measured and the offsets O are derived calculated from a combination of the measured resistances and the stored rotational position of the camera lens element 20. Thus, the offsets O compensate for the variation in of the SMA actuation arrangement 10 that may occur over time.

By way of example, this may be approached for the first configuration of the SMA actuation arrangement 1 using the following method which refers to the rotational position around the x axis, an equivalent method also being applied to the rotational position around the y axis.

Consider the case that the rotational position around the x axis is a function of the length of SMA actuator wires 30 of equal length labelled a, b, e and f. The length of the SMA actuator wires 30 is related to the resistance of the SMA actuator wires 30 so that $RotX=K*(Ra-Rb+Re-Rf)$ where K is a constant of proportionality and Ra, Rb, Re and Rf are the resistances of wires a, b, e and f respectively.

A reference feature (e.g. endstops or the image sensor 11 itself) may be provided which the camera lens element 20 hits when driven some distance along the optical axis (i.e. along the z axis) towards the image sensor 11. During manufacture, a planar image target is arranged parallel to the image sensor 11. The drive signals applied to the SMA actuator wires 30 are varied until the image is in focus at all points on the image sensor, showing that the lens is at the desired tilt. The resistance of all the wires are measured and these are used to calculate a first reference offset Roff1 equal to $K*(Ra-Rb+Re-Rf)$.

Then, the drive signals applied to the SMA actuator wires 30 are varied to drive the camera lens element 10 towards the image sensor 11 and the resistances of the SMA actuator wires 30 are measured when contact is made with the reference feature. That is, the resistance of the SMA actuator wires 30 that pull the camera lens element 10 away from the image sensor 11 will stop increasing and the resistance of the SMA actuator wires 30 that pull the actuator towards the image sensor 11 will stop decreasing. A feature of this profile (for example the maximum and minimum resistances) is then recorded for all the SMA actuator wires 30. These resistances are used to calculate a second reference offset Roff2 equal to $K*(R0-R1+R4-R5)$.

The difference between the first and second reference offsets (Roff2−Roff1) is then a measure of the absolute rotational position of the camera lens element 20 when it makes contact with the reference feature.

The calibration of the offsets O that is performed during use, for example when the SMA actuation arrangement 1 is powered up, is as follows. The drive signals applied to the SMA actuator wires 30 are varied to drive the camera lens element 10 towards the image sensor 11 and the resistances of the SMA actuator wires 30 are measured when contact is made with the reference feature. A feature of this profile (for example the maximum and minimum resistances) is then recorded for all the wires. These resistances are used to calculate a third reference offset Roff3 equal to $K*(R0-R1+R4-R5)$. A total offset in rotational position Rtotal can then be calculated as (Roff3−Roff2+Roff1) and so the offset is derived as Rtotal/K. Although this discussion refers to reference offsets in position, the stored parameters may be resistances since the values of K cancel out.

Although the description above refers to use of a constant target resistance value representing a constant desired rotational position, the techniques may similarly be applied with respect to movement in any of the degrees of freedom.

There will now be considered the offsets O in respect of translation of the camera lens element laterally of the optical axis of the camera lens element 20, i.e. along the x axis and y axis. In this case, for many applications including OIS, it is desirable to have a reference position from which the camera lens element 20 is made to move, typically being the rest position. Thus, the target resistance values may represent a desired lateral position of the movable element with respect to the support structure that varies around the reference position. In this case, the offset may adjust the actual translational position to match the desired translational position.

The invention claimed is:

1. A method of controlling drive signals supplied to SMA actuator wires in an SMA actuation arrangement wherein the SMA actuator wires are connected in tension between a support structure and a movable element in an arrangement in which the SMA actuator wires are capable of driving movement of the movable element with respect to the support structure with plural degrees of freedom on selective contraction of the SMA actuator wires, the method comprising:

setting target values representing a desired position of the movable element with respect to the support structure;

detecting measures of resistance of each SMA actuator wire;

deriving errors from the target values and the detected measures of resistance, the errors being adjusted by offsets having values selected to adjust the actual position of the movable element to match the desired positions represented by the target values in respect of at least one of the degrees of freedom to correct for variances in the actual position due to manufacturing tolerances or in the response of the SMA actuator wires over time, wherein the offsets are calibrated based on the measures of resistance of the SMA actuator wires while the movable element is at a known position; and controlling the powers of the drive signals supplied to SMA actuator wires in accordance with the adjusted errors.

2. The method according to claim 1, wherein an image sensor is mounted on the support structure, and the movable element is a camera lens element arranged to focus an image on the image sensor.

3. The method according to claim 2, wherein the degrees of freedom include rotations of the camera lens element with respect to the support structure about axes perpendicular to the optical axis, and the errors are adjusted by offsets in respect of said rotations of the camera lens element with respect to the support structure about said axes perpendicular to the optical axis.

4. The method according to claim 3, wherein the target values represent constant desired rotational positions of the camera lens element with respect to the support structure about said axes perpendicular to the optical axis.

5. The method according to claim 4, wherein the target values represent constant desired rotational positions of the camera lens element with respect to the support structure about said axes perpendicular to the optical axis in which the optical axis of the camera lens element is perpendicular to the image sensor.

6. The method according to claim 3, further comprising calibrating the offsets based on measurements of the resistance of the SMA actuator wires while the camera lens element is at a known position.

7. The method according to claim 6, wherein the offsets are calibrated while the camera lens element is at a known position at which the focus of the image on the image sensor is optimised.

8. The method according to claim 6, wherein the SMA actuation arrangement further comprises a reference feature against which the camera lens element may be driven, and the offsets are calibrated based on measurements of the resistance of the SMA actuator wires while the camera lens element is at a known position contacting the reference feature.

9. The method according to claim 6, wherein the step of calibrating the offsets is performed during use of the SMA actuation arrangement and the offsets are calibrated when the SMA actuation arrangement is powered up.

10. The method according to claim 6, wherein the step of calibrating the offsets is performed during manufacture of the SMA actuation arrangement.

11. The method according to claim 1, wherein the target values represent a constant desired position of the movable element with respect to the support structure in respect of at least one of the degrees of freedom.

12. The method according to claim 1, wherein the SMA actuation arrangement further comprises a reference feature against which the movable may be driven, and the offsets are calibrated based on measurements of the resistance of the SMA actuator wires while the movable element is at a known position contacting the reference feature.

13. The method according to claim 1, wherein the step of calibrating the offsets is performed during use of the SMA actuation arrangement and the offsets are calibrated when the SMA actuation arrangement is powered up.

14. The method according to claim 1, wherein the step of calibrating the offsets is performed during manufacture of the SMA actuation arrangement.

15. The method according to claim 1, wherein the offsets are pre-stored in the SMA actuation arrangement.

16. The method according to claim 1, wherein
the target values are set in respect of each of the degrees of freedom, and
the step of detecting errors comprises:
deriving feedback values in respect of each of the degrees of freedom, the feedback values being linear sums of the measures of resistance of the SMA actuator wires, and
deriving errors between the target values and the feedback values in respect of each of the degrees of freedom.

17. The method according to claim 1, wherein the camera lens element comprises one or more lens having a diameter of no more than 10 mm.

18. An SMA actuation arrangement comprising:
a support structure;
a movable element suspended on the support structure;
plural SMA actuator wires connected in tension between the support structure and the movable element in an arrangement in which the SMA actuator wires are capable of driving movement of the movable element with respect to the support structure with plural degrees of freedom on selective contraction of the SMA actuator wires; and
a control circuit arranged to supply drive signals to the SMA actuator wires, the control circuit being arranged to control the drive signals by:
setting target values representing a desired position of the movable element with respect to the support structure;

detecting measures of resistance of each SMA actuator wire;

deriving errors from the target values and the detected measures of resistance, the errors being adjusted by offsets having values selected to adjust the actual position of the movable element to match the desired positions represented by the target values in respect of at least one of the degrees of freedom to correct for variances in the actual position due to manufacturing tolerances or in the response of the SMA actuator wires over time, wherein the offsets are calibrated based on the measures of resistance of the SMA actuator wires while the movable element is at a known position; and controlling the powers of the drive signals supplied to SMA actuator wires in accordance with the adjusted errors.

19. A method of calibrating offsets for use in the method according to claim 1, the method comprising calibrating the offsets during manufacture of the SMA actuation arrangement.

* * * * *